No. 787,044.
Patented April 11, 1905.

UNITED STATES PATENT OFFICE.

SAMUEL RIDGWAY KENNEDY, OF PHILADELPHIA, PENNSYLVANIA, ASSIGNOR TO THE AMERICAN DAIRY PRODUCTS AND MANUFACTURING COMPANY, OF PHILADELPHIA, PENNSYLVANIA, A CORPORATION OF PENNSYLVANIA.

CONDENSED MILK.

SPECIFICATION forming part of Letters Patent No. 787,044, dated April 11, 1905.

Application filed April 15, 1903. Serial No. 152,793.

*To all whom it may concern:*

Be it known that I, SAMUEL RIDGWAY KENNEDY, a citizen of the United States, residing at Philadelphia, in the county of Philadelphia and State of Pennsylvania, have invented or discovered a new and useful article of Manufacture Consisting of a Product of Condensed Milk, of which the following is a specification.

My invention relates to evaporated or condensed milk or cream; and it consists of a new and modified form of these articles possessing new and valuable properties rendering them superior for most purposes for which they were formerly used and useful for other purposes to which the old forms were not adapted.

My improved manufacture consists of evaporated or condensed milk or cream of a smooth unctuous consistency, free from grit or so-called "sandiness," and having a much less proportion of sugar and salts than the ordinary condensed milk.

The following is the most suitable process of manufacturing my improved product at present known to me.

After pasteurizing the milk or cream or any admixture thereof which may be desired, and which I shall hereinafter include under the generic name of "milk," is drawn into a vacuum-pan at about twenty-five to twenty-eight inches and evaporated down to between 11° to 27° Baumé, according to the season of the year, as known to those skilled in the art. It is then run into cans or tanks and refrigerated to 32° or 33° Fahrenheit. The room should be at about 32° Fahrenheit, which will make the milk about 33° Fahrenheit, as it is best to not quite reach the freezing-point. At this temperature the sugar of milk and salts will quickly crystallize by the sudden chill. The substance is now run into an ordinary sugar centrifugal with perforated sides, which should be lined with some fine filtering material, such as cotton or linen cloth or similar fabric having a mesh fine enough to hold the crystals. I am at present using grass-linen. On operating the centrifugal the milk, water, butter-fats, albumen, casein, and albumose, together with a small portion of sugar of milk still in solution, will pass through the filter, leaving the crystallized sugar of milk and salts on the surface. This concludes the process where the so-called "evaporated cream" is wanted. If the superheated goods are wanted, which are adapted to most of the purposes above set forth, the "sling," as the material that passes through the filter is called, is now returned to the vacuum-pan and put under a vacuum of twenty-seven inches dry or twenty-five inches wet, when superheated air or live steam at one hundred pounds pressure is blown in a fine jet up through the mass until the vacuum reaches three and one-half to four inches, not lower, when the mass will thicken like a custard. Either the hot air or the steam may be used, but I am at present using steam. The steam is now shut off, water turned into the condenser, and the pump started, pumping off the odors of the "high cook" until the vacuum again reaches twenty-five to twenty-eight inches. On starting the pump the mass will rise rapidly, yeast like, and to prevent the entrainment and consequent loss of milk a sharp concussion should be given with air through the air-cock or butter-cup, which will break the entrainment. The condensed milk is now drawn into cooling-cans, beaten or aerated, and placed in refrigeration for not less than forty-eight hours, when it is ready for the market. This product is thick, smooth, and heavy, much thicker than ordinary condensed milk of the same degree of condensation, and it is extremely valuable in the making of ice-cream, in thickening milk and cream, instead of eggs in cakes and confectionery, and for various uses in the arts.

The product in its uncooked state, which I have termed "evaporated cream," is also of an even, smooth, unctuous quality, entirely free from the common gritty or sandy feeling even when kept for a long time, and it has a much fresher and more natural taste than ordinary condensed milk, in which the presence of the sugar and salts tends to give an undesirable sweetness and a taste sometimes described as "burnt." My product in both the cooked and uncooked forms is free from this so-called burnt taste.

Having, as above, fully described my invention and the best method known to me of preparing the same, what I claim, and desire to secure by Letters Patent, is—

1. The above-described article of manufacture consisting of a condensed-milk product of a smooth, unctuous quality and agreeable taste, containing the usual elements of condensed milk except the sugar and salts which are present only in a greatly-reduced proportion.

2. The above-described article of manufacture consisting of a condensed-milk product of a smooth, thick and custard-like consistency and agreeable taste, containing the usual elements of condensed milk except the sugar and salts which are present only in a greatly-reduced proportion.

In witness whereof I have hereunto subscribed my name, this 13th day of April, 1903, in the presence of two subscribing witnesses.

SAMUEL RIDGWAY KENNEDY.

Witnesses:
R. C. SNYDER,
JOHN DOLMAN.